US00RE40107E

(19) United States
(12) Reissued Patent
Peters et al.

(10) Patent Number: US RE40,107 E
(45) Date of Reissued Patent: Feb. 26, 2008

(54) VIDEO/AUDIO TRANSMISSION SYSTEM AND METHOD

(75) Inventors: Eric C. Peters, Carlisle, MA (US); Stanley Rabinowitz, Westford, MA (US)

(73) Assignee: Avid Technology, Inc., Tewksbury, MA (US)

(21) Appl. No.: 09/971,236

(22) Filed: Oct. 4, 2001

Related U.S. Patent Documents

Reissue of:
(64) Patent No.: 5,045,940
Issued: Sep. 3, 1991
Appl. No.: 07/455,567
Filed: Dec. 22, 1989

U.S. Applications:
(63) Continuation of application No. 08/418,863, filed on Apr. 7, 1995, which is a continuation of application No. 08/116,905, filed on Sep. 3, 1993, now abandoned.

(51) Int. Cl.
*H04N 7/00* (2006.01)

(52) U.S. Cl. ..... 348/472; 348/484; 709/219; 709/251; 725/145; 725/148; 725/151; 725/92

(58) Field of Classification Search ..... 348/472, 348/484; 709/219, 251; 725/145, 148; 711/112, 711/113, 118, 131; 707/201, 204, 205
See application file for complete search history.

(56) References Cited

U.S. PATENT DOCUMENTS

| | | | | |
|---|---|---|---|---|
| 3,609,227 A | | 9/1971 | Kuljian | |
| 4,536,836 A | * | 8/1985 | Dodd et al. | 711/113 |
| 4,667,286 A | * | 5/1987 | Young et al. | 711/113 |
| 4,698,664 A | | 10/1987 | Nichols et al. | |
| 4,882,743 A | | 11/1989 | Mahmoud | |
| 4,949,169 A | | 8/1990 | Lumelsky et al. | |
| 4,956,768 A | * | 9/1990 | Sidi et al. | 710/53 |

OTHER PUBLICATIONS

PCT International Search Report dated Jan. 15, 2003.

* cited by examiner

*Primary Examiner*—M. Lee
(74) *Attorney, Agent, or Firm*—Mintz, Levin, Cohn, Ferris, Glovsky and Popeo, P.C.

(57) ABSTRACT

The invention is a data pipeline system which synchronizes the display of digitized audio and video data regardless of the speed at which the data was recorded on its linear medium. To do this, the video data is played at a constant speed, synchronized by the audio speed. Further, the invention uses a method of "staging" data in storage buffers, i.e., ring buffers, which encourages efficient use of the viewer module resources by not permitting the viewer to read excessive amounts of data at any one time, i.e., to read only enough data into any one ring buffer so that the amount of data in the ring buffer is roughly equivalent to the amount of data in the other ring buffers and yet permitting the viewer to read large enough chunks of data to promote efficient use of the fill system.

30 Claims, 7 Drawing Sheets

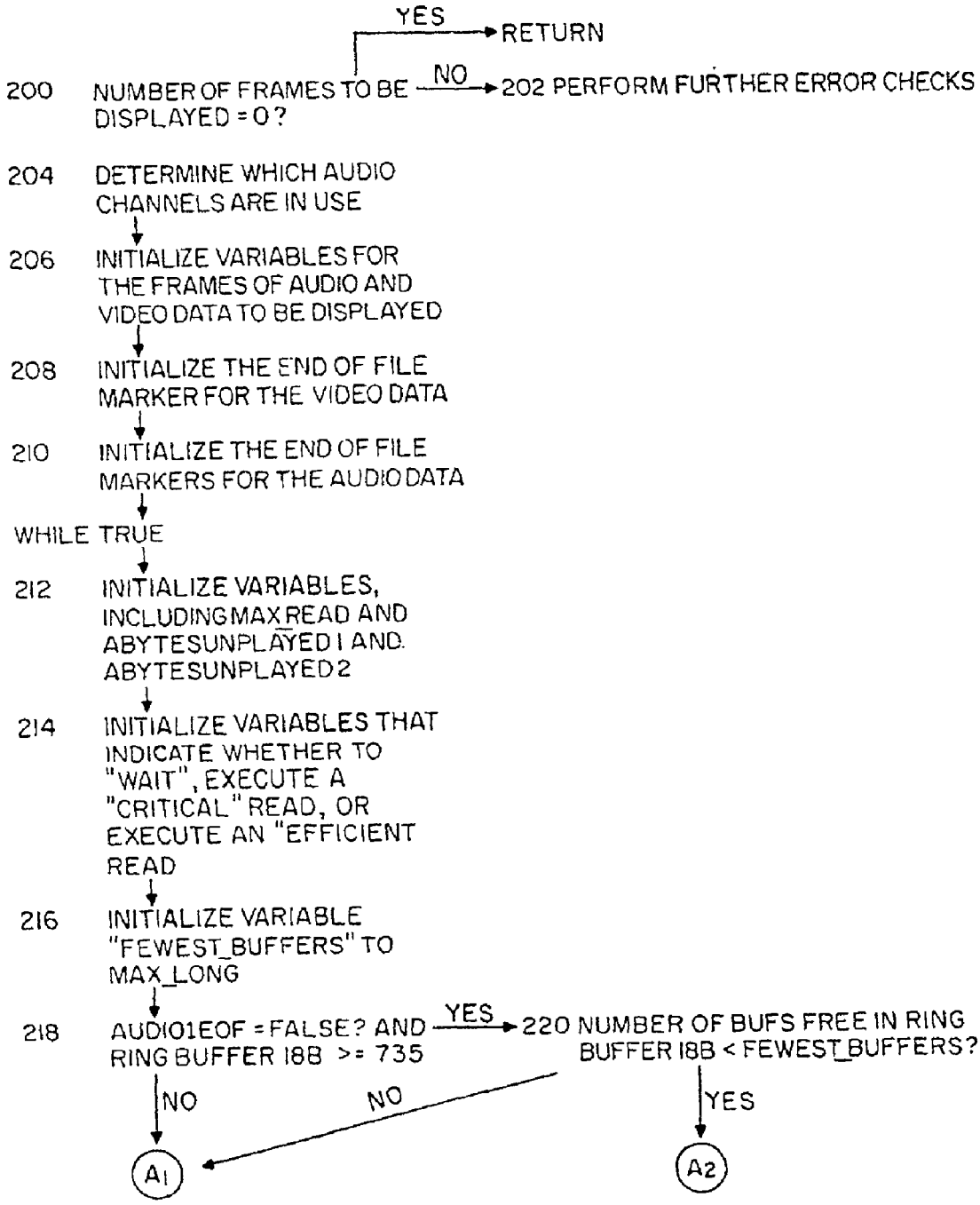
FIG. 3 (1)

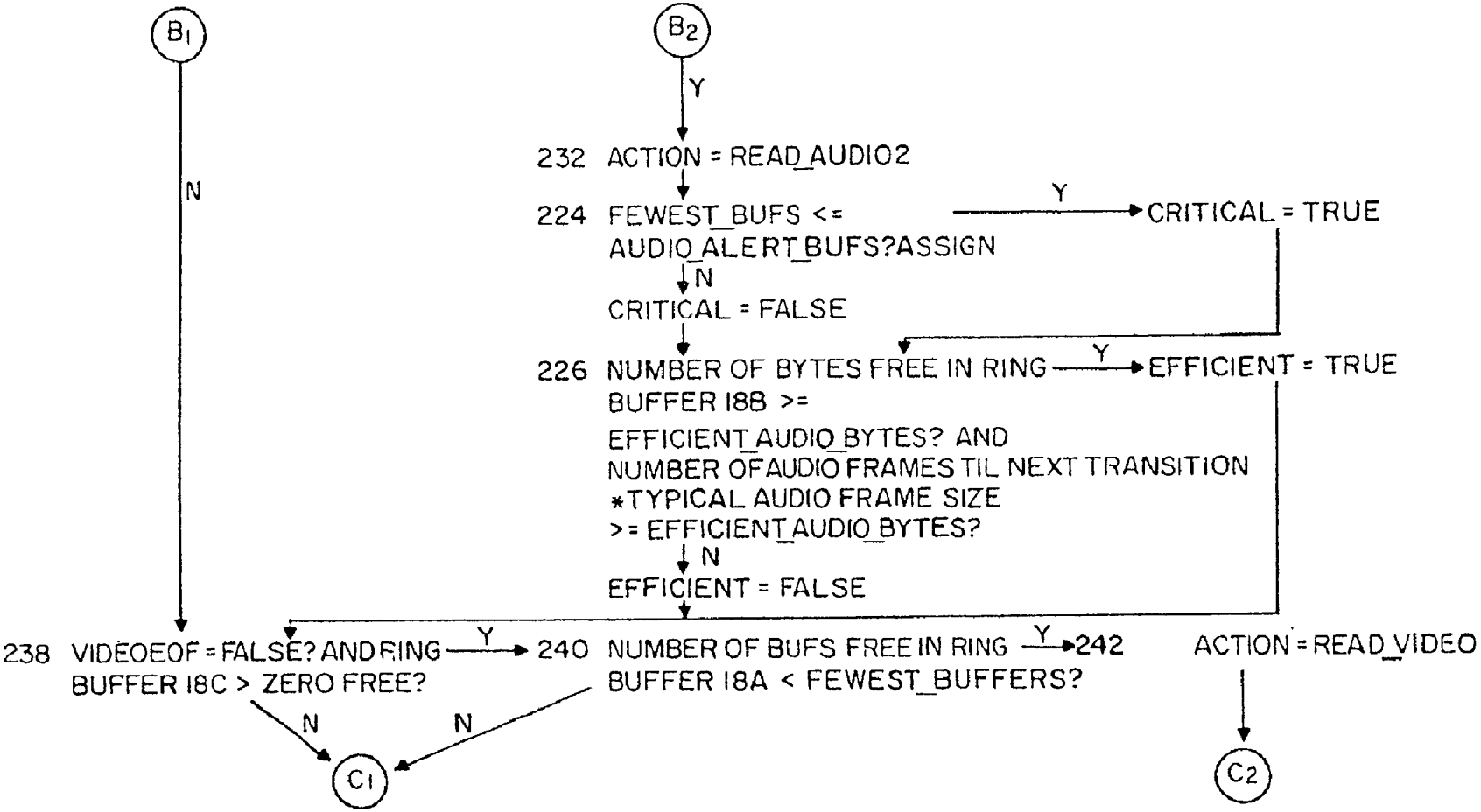
FIG. 3 (3)

VIDEO/AUDIO TRANSMISSION SYSTEM AND METHOD

Matter enclosed in heavy brackets [ ] appears in the original patent but forms no part of this reissue specification; matter printed in italics indicates the additions made by reissue.

*PRIOR APPLICATIONS*

*This application is a continuation reissue application of reissue application Ser. No. 08/418,862, filed on Apr. 7, 1995, which is a continuation of reissue application Ser. No. 08/116,905, filed on Sep. 3, 1993 for reissue of U.S. Pat. No. 5,045,940, which is incorporated herein by reference.*

REFERENCE TO MICROFICHE APPENDIX

The application includes a microfiche appendix pursuant to 37 CFR 1.96(b) containing 1 microfiche with 44 frames.

BACKGROUND OF THE INVENTION

The invention relates to displaying non-linear media data, i.e., digitized audio and video data.

Non-linear media data is audio and video data recorded on a linear medium, e.g., a VHS videotape cassette, and stored in digitized form on a computer storage device, e.g., a hard disk drive. Typically, linear audio data is recorded with a "pulse" equal to the speed at which the linear video data is recorded. That is, if the video data is recorded at 30 frames per second (fps), the accompanying audio data is likewise recorded at 30 fps. This is obviously the case where the audio and video data are recorded simultaneously on a single medium, e.g., a single videotape cassette. However, the recording of the audio data can be distinct from the recording of the video data, e.g. a soundtrack can be recorded in London and a film clip can be shot on location in the Sahara Desert, in which case the speed of recording the video and the audio may or may not be equal. In addition, the standard speeds for filming video and recording audio vary from country to country. For example, the standard speed for recording video in the United States is 30 fps, while the standard speed in Europe is 24 fps. Likewise, the audio sampling rate standard is 22 kHz, but 44 kHz is also used. Thus, in cases where the speeds are different, the two recordings (often referred to as media "channels") must be effectively combined and displayed so that there are no visible or audible gaps or overlaps.

As noted above, the speed at which video data is recorded and displayed can vary, e.g., from 30 fps to 24 fps. Video data from different countries, however, can be successfully edited together and played at a single speed because the human eye cannot detect subtle variations in the number of frames per second. The human ear, however, can detect even subtle variations in the speed at which audio data is played. These variations appear as audible clicks, silences, or other distortions. Over time, differences in the speed at which the video data is displayed and the audio data are played results in visibility and audibly mismatched video and audio data.

SUMMARY OF THE INVENTION

The invention is a data pipeline system which synchronizes the display of digitized audio and video data regardless of the speed at which the data was recorded on its linear medium. To do this, the video data is played at a constant speed, synchronized by the audio speed. The system includes a media file database (MFD) that contains a number of media files, each of which contains either digitized audio or digitized video media data. The system also includes a viewer module which synchronizes operations to transfer the media data from the media files into a number of ring buffers (preferably software). Each ring buffer is associated with a media channel being displayed. For example, there is a ring buffer which contains media data for the video channel, a ring buffer which contains media data for a first audio channel, and a ring buffer which contains media data for a second audio channel. The two audio channels are for stereo. The viewer module also synchronizes calls to a video accelerator card and a sound accelerator card so that the video data and audio data, which were recorded on a linear medium at differing pulse rates, are displayed at a constant rate without visible or audible gaps or overlaps.

Further, the invention uses a method of "staging" data in the storage buffers, particularly ring buffers, to coordinate buffer loading to encourage efficient use of the viewer module resources by not permitting the viewer to read excessive amounts of data at any one time, i.e., to read only enough data into any one ring buffer so that the amount of data in the ring buffer is approximately equivalent to the amount of data in the other ring buffers.

Other advantages and features will become apparent from the following description, and from the claims.

DESCRIPTION OF THE PREFERRED EMBODIMENT

Figure 1:
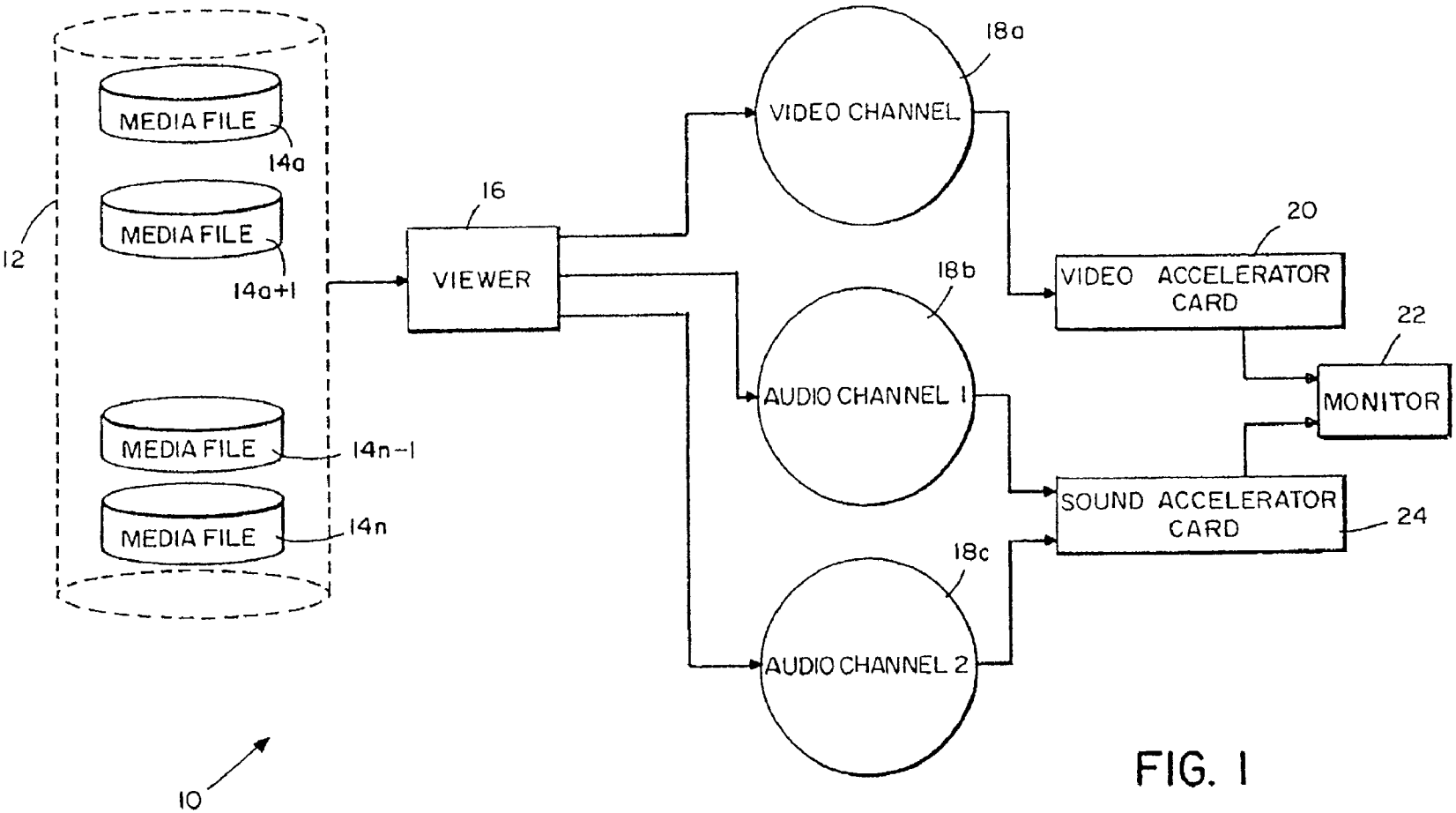
FIG. 1 is a block diagram of the components of a pipeline system according to the present invention.

Referring to FIG. 1, a pipeline system 10 includes a media file database (MFD) 12 which contains a number of media files 14a-14n. Each media file 14 contains either digitized audio or digitized video media data and is divided into sections called "frames". In the embodiment here described, one frame of video data is considered equivalent to the standard U.S. video frame, i.e., a video frame which is displayed for 1/30th of a second, regardless of whether it was recorded at 30 fps or some other speed. Similarly, one frame of audio data (also referred to as an "audio buffer"), is standardized to consist of 735 audio samples, which are played in the time equivalent of one video frame, i.e., 1/30th of a second.

The pipeline system 10 also includes a viewer module 16 which synchronizes the transfer of media data from the media files 14 into three ring buffers 18a-18c which store the data or pointers to the data before it is displayed. For convenience, the terms "view" and "display" are used herein with respect to audio as well as video and should be understood to mean "play" when referring to audio. Each ring buffer is associated with a media channel. That is, ring buffer 18a contains media data for the video channel, ring buffer 18b contains media data for audio channel 1, and ring buffer 18c contains media data for audio channel 2. Upon a signal from the viewer module, a pointer to a frame of video data in the ring buffer 18a is transferred to a conventional video accelerator card 20 preferably TRUEVISION ® model NuVista which displays the video data on a monitor 22. Likewise, upon a signal from the viewer module 16, a pointer to a frame of audio data in the ring buffers 18b and 18c is transferred to a conventional sound accelerator card 24 preferably DIGIDESIGN ® model SOUND ACCEL- ERATOR which plays the audio data through the monitor 22. The operation of the system and synchronization of the displaying of video data and playing of audio data is described below in connection with FIG. 2.

Figure 2:
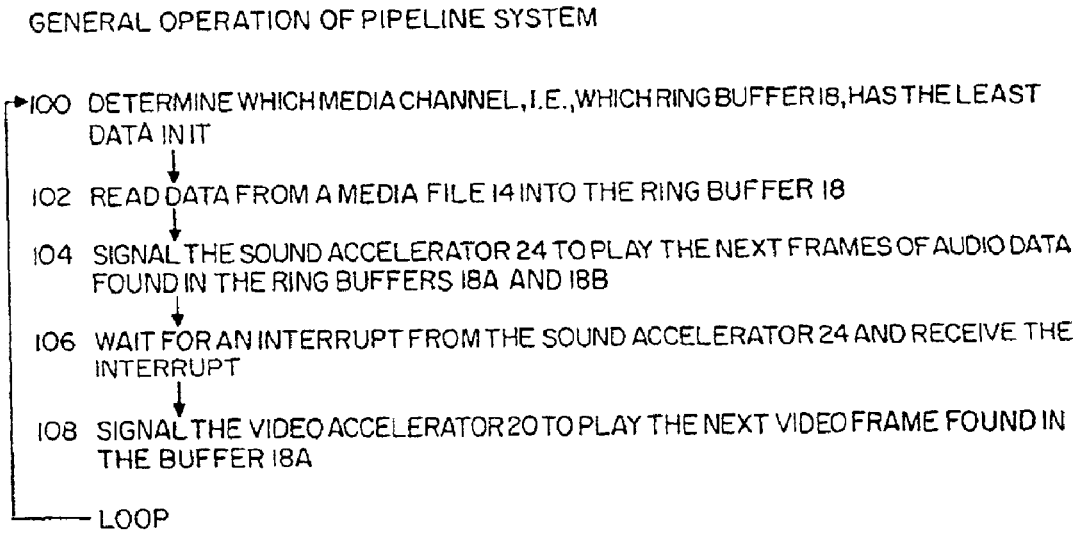
FIG. 2 is a flow chart of the general operation of the system.

Referring to FIG. 2, the operation of the pipeline system 10 (FIG. 1) is shown in flow chart form. Briefly, because it takes time to read data from the media files, and because typically all of the data will not fit into memory at any one time, the pipeline performs a real time "juggling act" to read from the files at the precise moment the data is required and in such a way as not to interfere with displaying the data in an essentially uninterrupted flow. To do this, the viewer module determines which channel, i.e., which ring buffer 18, has the least data in it (step 100), reads data from a media file 14 into the ring buffer (step 102), and signals the sound accelerator 24 to play the next frames of audio data found in the ring buffers 18b and 18c (step 104). The viewer module 16 then waits for an interrupt from the sound accelerator 24 (step 106) which indicates that it is time to display the next frame of video data. Once the viewer module 16 receives the interrupt from the sound accelerator 24, it signals the video accelerator 20 to play the next video frame found in the buffer 18a (step 108). In this way, the frames of video data are synchronized by the frames of audio data. That is, at the end of every 735 audio samples, a new video frame is displayed. Thus, visible and audible discrepancies between the display of video and audio data are markedly reduced if not eliminated.

Figure 3:
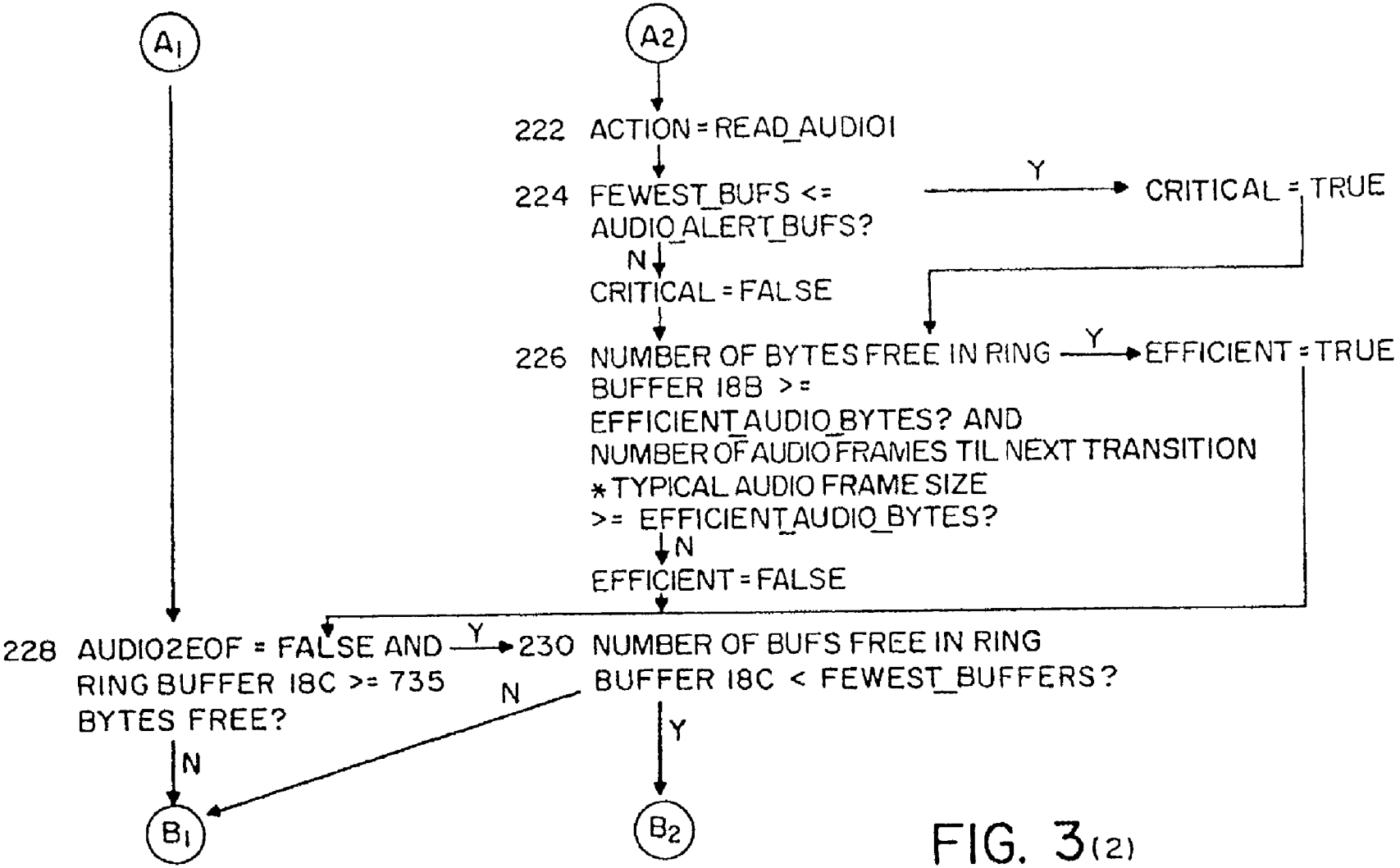
FIG. 3 is a flow chart of the specific operation of the PLAY_AV procedure of the system.
Figure 3:
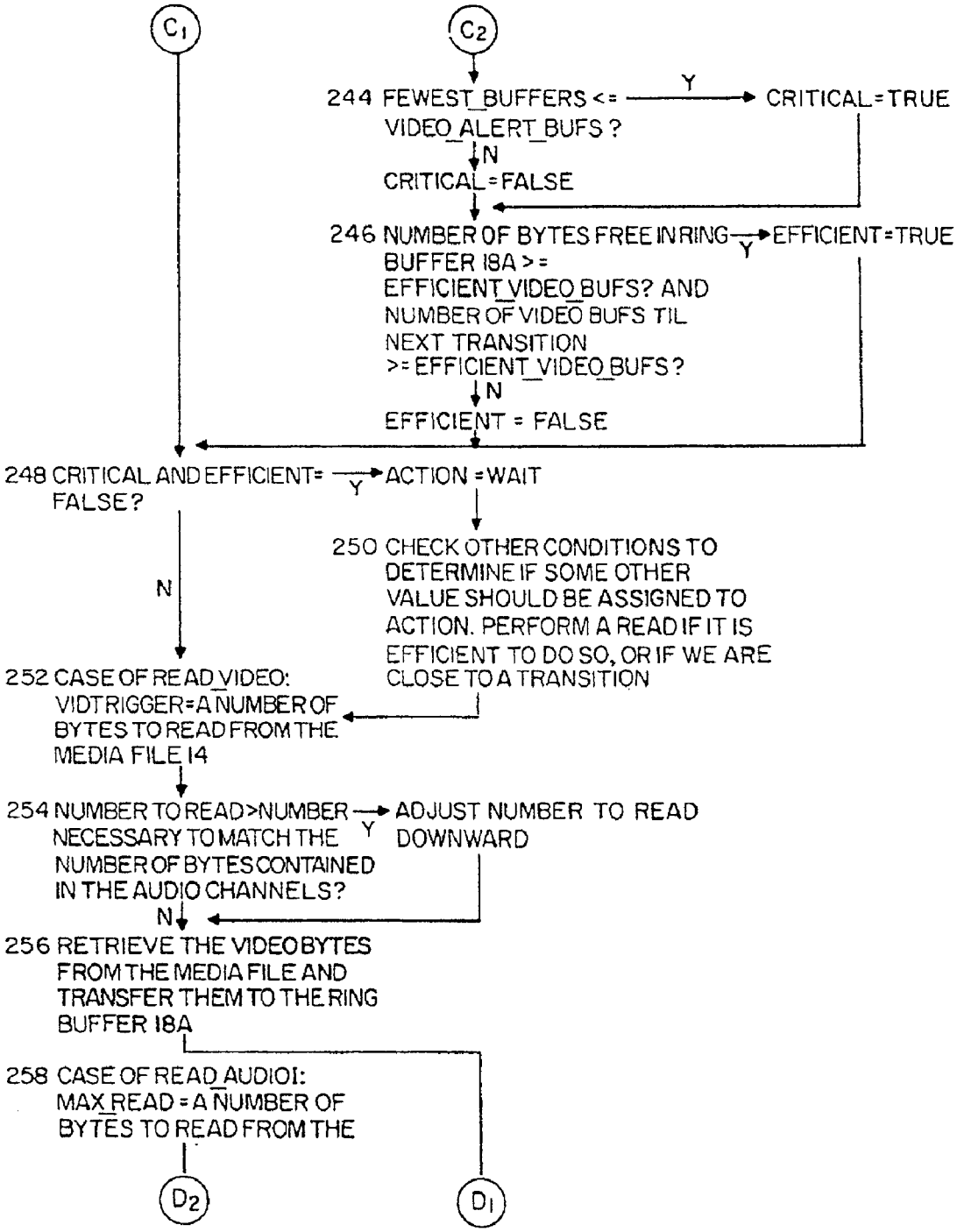
Figure 3:
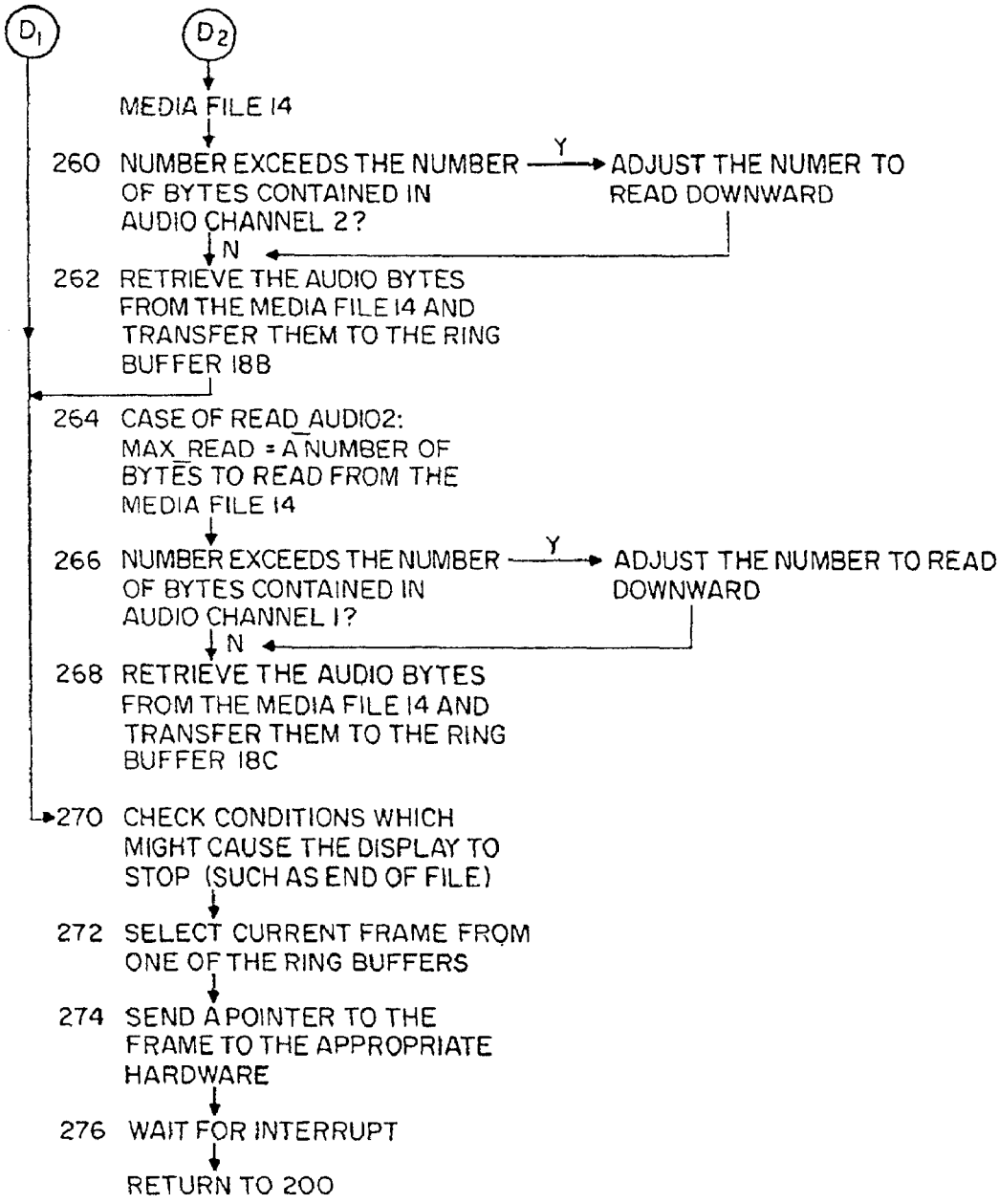

In general, "staging" the data in the ring buffers 18 encourages efficient use of the viewer module resources by not permitting the viewer to read excessive amounts of data at any one time, i.e., to read only enough data into any one ring buffer so that the amount of data in the ring buffer is roughly equivalent to the amount of data in the other ring buffers (see steps 254, 260 and 266 in FIG. 3). The staging process also encourages efficient use of the file system (disks where media is stored) by permitting large efficient reads from the disk when there is time available.

Referring to FIG. 3, the procedure PLAY_AV is shown in flow chart form. The purpose of PLAY_AV is to fill the ring buffers using the staging method discussed above, and to play a sequence of frames or "clip" of video and audio data in such a manner that the video data is synchronized by the audio data as discussed above.

Before PLAY_AV is called the system preloads all the ring buffers with data. This considerably improves efficiency since this can be done before the time-critical operations occur.

Fist, PLAY_AV performs an error check, i.e., determines if the number of frames to be played is zero (step 200). If the number of frames to be displayed is not zero, then PLAY_AV performs further error checks, e.g., determines that the audio capability of the monitor 22 is initialized (by checking the value of the Boolean variable AUDIO_INIT_DONE) and that the audio data is to be used to synchronize the video data (by checking the value of the Boolean variable SOUND_SYNC) (step 202). Next, if there are no errors (step 202), then PLAY_AV determines which audio channels are in use (step 204), i.e., from which of the ring buffers 18 audio data will be read. Note that the embodiment described here uses two audio data channels, i.e., audio channel 1 and audio channel 2. Additional channels and hence additional buffers are of course possible. Fewer channels (i.e., 1) are also permitted.

Having determined which channels are in use, PLAY_AV next initializes variables for the frames of audio and video data to be displayed (step 206), i.e., assigns a value of 0 to the variables "nextAudio1", "nextAudio2", and "nextVideo". In addition, PLAY_AV initializes the end of file marker for the video data ("videoEOF") to FALSE (step 208) and also initializes the end of file markers for the audio data ("audio1EOF" and "audio2EOF") (step 220). Specifically, if audio channel 1 is being used (step 204) and soundsync is TRUE (step 202), then audio1EOF equals FALSE. Otherwise, audio1EOF equals TRUE. Likewise, if audio channel 2 is being used (step 204) and soundsync is TRUE (step 202), then audio2EOF equals FALSE. Otherwise, audio2EOF equals TRUE.

Once PLAY_AV has determined from which channels it will read data (steps 204-210), it begins an infinite (while TRUE) loop to read, transfer, and display media data. PLAY_AV does not exit the loop until the clip is exhausted, i.e., there are no more frames to display. At the beginning of each pass through the loop, PLAY_AV initializes several variables, including the maximum number of bytes it will read ("max_read") and the number of audio channel 1 and audio channel 2 bytes yet to be played ("AbytesUnplayed1" and "AbytesUnplayed2") (step 212). In addition, PLAY_AV initializes several variables that indicate whether it should "wait", execute a "critical" read, or execute an "efficient" read (step 214) (each of which is described below in more detail), and also initializes a variable "fewest_buffers" to MAX_LONG (step 216), i.e., a number far larger than the number of bytes in a ring buffer.

Having initialized the loop variables, PLAY_AV next determines which of the ring buffers has the least amount of data in it, i.e., which ring buffer has fewer bytes free. PLAY_AV begins by checking ring buffer 18b (audio channel 1) as described below.

To determine what the state of ring buffer 18b (audio channel 1) is, PLAY_AV determines if audio1EOF is FALSE and ring buffer 18b has at least 735 bytes free (step 218). If so, PLAY_AV goes on to determine if the number of bytes free in ring buffer 18b is less than fewest buffers (step 220) (which is always true initially since fewest_buffers was assigned MAX_LONG above). The action variable is then assigned a value of "read_AUDIO1" (step 222). The critical variable is assigned a value of TRUE if fewest_buffers is less than a predefined number (AUDIO_ALERT_BUFS), and is assigned a value of FALSE otherwise (step 224). And the efficient variable is assigned a value of TRUE if the number of bytes free in ring buffer 18b is greater than or equal to a predefined number (EFFICIENT_AUDIO_BYTES) and if the size of the next audio frame times the typical audio frame size is greater than or equal to EFFICIENT_AUDIO_BYTES (step 226). Otherwise the variable efficient is assigned a value of FALSE.

To determine what the state of ring buffer 18c (audio channel 2) is, PLAY_AV determines if audio2EOF is FALSE and ring buffer 18c has at least 735 bytes free (step 228). If so, PLAY_AV goes on to determine if the number of bytes free in ring buffer 18c is less than fewest buffers (step 230) (i.e., whether ring buffer 18c has fewer bytes than ring buffer 18b as determined above). If ring buffer 18c indeed contains fewer bytes, the action variable is assigned a value of "read_AUDIO2" (step 232). The critical variable is assigned a value of TRUE if fewest_buffers is less than a predefined number (AUDIO_ALERT_BUFS), and is assigned a value of FALSE otherwise (step 234). And the efficient variable is assigned a value of TRUE if the number of bytes free in ring buffer 18c is greater than or equal to a predefined number (EFFICIENT_AUDIO_BYTES) and if the size of the next audio frame times the typical audio frame size is greater than or equal to EFFICIENT_AUDIO_BYTES (step 236). Otherwise the efficient variable is assigned a value of FALSE.

Finally, to determine what the state of ring buffer 18a (video channel) is, PLAY_AV determines if videoEOF is FALSE and ring buffer 18c has at least 1 byte free (step 238). If so, PLAY_AV goes on to determine if the number of bytes free in ring buffer 18a is less than fewest_buffers (step 240) (i.e., whether ring buffer 18a has fewer bytes than ring buffer 18c as determined above). If ring buffer 18a indeed contains fewer bytes, the action variable is assigned a value of "read_VIDEO" (step 242). The critical variable is assigned a value of TRUE if fewest_buffers is less than a predefined number (VIDEO_ALERT_BUFS), and is assigned a value of FALSE otherwise (step 244). And the efficient variable is assigned a value of TRUE if the number of bytes free in ring buffer 18a is greater than or equal to a predefined number (EFFICIENT_VIDEO_BUFS) and if the size of the next video frame is greater than or equal to EFFICIENT_VIDEO_BUFS (step 246). Otherwise, the efficient variable is assigned a value of FALSE.

Having determined, in steps 218-246, which channel and hence ring buffer has the fewest bytes and therefore should be filled, PLAY_AV executes either a critical read operation or an efficient read operation depending on the values assigned to the critical and efficient variables. In addition, the execution of the efficient read operation further depends on two factors: 1) whether there is an upcoming transition between clips, i.e., the end of the current clip is near and the viewer 16 will soon need to retrieve data from a different media file 14; and 2) whether the viewer is coming to an end of the ring buffer from which it is reading. If either of these factors is true, the efficient variable is also true. Thus, if the critical and efficient variables are both FALSE (step 248), PLAY_AV assigns the value of "wait" to the action variable and checks several other conditions to determine if some other value should be assigned to the action variable (step 250). (The conditions are reproduced below in Boolean notation below for ease of understanding).

```
if (!critical && !efficient)
  {
  action = wait;
  if (!videoEOF && vbufsFree >= VID_MIN_READ &&
        ( (vbufsFree >= EFFICIENT_VIDEO_
        BUFS)
          || ( (nextVideoTA < EFFICIENT_
          VIDEO_BUFS) && (nextVideoTA > 0))
      )
    )
            {
            action = read_VIDEO;
            }
  if (action == wait && !audio1EOF
        && (aring1.abytesFree >= 735)
        && ( (aring1.abytesFree >= EFFICIENT_
        AUDIO_BYTES) ||
                (
                  (nextAudio1TA*TYPICAL_
                  AUDIO_BUFFER_SIZE <
                  EFFICIENT_AUDIO_
                  BYTES)
              && (nextAudio1TA > 0)
              )
          )
    )
            {
            action = read_AUDIO1:
            }
```

-continued

```
if(action != read_VIDEO && !audio2EOF
      && (aring2.abytesFree > 735)
      && ( (aring2.abytesFree >= EFFICIENT_
      AUDIO_BYTES) ||
              (
                (nextAudio2TA*TYPICAL_
                AUDIO_BUFFER_SIZE <
                EFFICIENT_AUDIO_
                BYTES)
            && (nextAudio2TA > 0)
            )
        )
  )
            {
            if (action == wait)
                  action = read_AUDIO2:
            else /* action is read_AUDIO1 */
                  {
                  /*
                    * Could do either A1 or A2
                    stuff.
                    * Do the one with the most
                    empty ring buffer.
                    */
                  if aring2.abytesFree > aring1.
                  abytesFree)
                    action = read_AUDIO2:
                  /* if not, then action is already
                  read_AUDIO1. */
                  }
            }
} /* end analysis for non-critical. non-efficient reads */
```

Depending on the outcome of the analysis above, the action variable has one of three values: read_VIDEO, read_AUDIO1, or read_AUDIO2. In the case of read_VIDEO, PLAY_AV assigns to the variable "vid-Trigger" a number of bytes to read from the media file 14 (step 252). However, if that number exceeds the number necessary to match the number of bytes contained in the audio channels, PLAY_AV adjusts the number downward (step 254) so that viewer resources are not tied up reading an excessive amount of video data. (See the discussion of staging above.) Finally, PLAY_AV retrieves the video bytes from the media file and transfers them to the ring buffer 18a (step 256).

In the case of read_AUDIO1, PLAY_AV assigns to the variable max_read a number of bytes to read from the media file 14 (258). However, if that number exceeds the number of bytes contained in audio channel 2, PLAY_AV adjusts the number downward (step 260) so that viewer resources are not tied up reading an excessive amount of audio data. Finally, PLAY_AV retrieves the audio bytes from the media file 14 and transfers them to the ring buffer 18b (step 262).

In the case of read_AUDIO2, PLAY_AV assigns to the variable max_read a number of bytes to read from the media file 14 (step 264). However, if that number exceeds the number of bytes contained in audio channel I, PLAY_AV adjusts the number downward (step 266) so that viewer resources are not tied up reading an excessive amount of audio data. Finally, PLAY_AV retrieves the audio bytes from the media file 14 and transfer them to the ring buffer 18c (step 268).

Having determined into which ring buffer to read data and done so (steps 218-268), PLAY_AV next checks several conditions which might cause the display to stop (step 270), e.g., the viewer reached the end of file for the video data, the viewer reached the end of file for the audio1 or audio2 data, or the user interrupted the display. Finally, PLAY_AV selects the current frame from one of the ring_buffers (step 272), and sends a pointer to the frame to the appropriate hardware (step 274), i.e., the video accelerator card 22 or the sound accelerator card 24 depending on whether the frame is video or audio. The hardware plays the frame (step 276) and then interrupts the software (step 278), i.e., PLAY_AV, which then repeats the above described process.

In order to ensure that the audio and video stay in synch, it is essential that the system read the correct number of audio bytes of data corresponding to the video frame being played. This is especially important where the audio track was digitized independently of the video track. To ensure synchronization, when any audio is digitized, the system stores away in the audio media file the number of video frames associated with that audio. Then, later, when a request for a certain number of frames of audio is made, the system can form a proportion against the original number of video frames and audio bytes to find the correct number of audio bytes needed to agree with the number of video frames in the current request.

To ensure efficiency when playing video that has been captured at less than 30 frames per second, the system stores a capture mask with any video media file that has been captured at this lower rate. The capture mask consists of a sequence of 0's and 1's. There are m one-bits and a total of n bits all together, to indicate that only m video frames are present out of every n. When playing this video, the system successively rotates this capture mask one bit to the left. If the high order bit is a 1, this means this is a new frame and we play it. If the bit is a 0, this means this is a repeated frame and we need not play it. The capture mask always ends with a 1, so when it shifts into a word of all 0's, we reload the capture mask.

The attached microfiche appendix (incorporated herein by reference) embodies the viewer module 16 of FIG. 1. The programming language and compiler used are THINK C version 3.01 by Symantec Corporation, and the computer used is the Macintosh II running under Mac OS version 6.0.2.

Portions of the disclosure of this patent document, including the appendix, contain material which is subject to copyright protection and as to which copyright is claimed. The copyright owner has no objection to the facsimile reproduction by anyone of the patent document as it appears in the Patent and Trademark Office files, but otherwise reserves all copyright rights whatsoever, for example, including but not restricted to the right to load the software on a computer system.

Other embodiments are within the following claims.

What is claimed is:

[1. A media pipeline system for displaying digitized audio and video, comprising:

a media file database for accepting and making available a plurality of media files, at least one of said media files having digitized audio media data and at least another one of said media files having video media data, each of said media files being divided into a plurality of frames;

a plurality of ring buffers;

a viewer module comprising procedures to synchronize the transfer of media data from the media files into said plurality of ring buffers, said ring buffers storing the media data before it is displayed;

a video accelerator connected to receive an output of at least one of said ring buffers for generating a video display output; and a sound accelerator connected to receive an output of at least one of said ring buffers for generating an audio output.]

[2. The system of claim 1 wherein one of said ring buffers receives and stores only audio media and another of said ring buffers receives and stores only video media.]

[3. The system of claim 2, wherein two of said ring buffers receive and store only audio data.]

[4. The system of claim 2, further comprising a controller for signalling said sound accelerator to start playing a part of the media data found on a ring buffer containing audio data, said sound accelerator producing an output signal after playing said part, said controller being responsive to said sound accelerator output signal for signalling said video accelerator to start displaying part of the media data stored in a ring buffer containing video data.]

[5. The system of claim 1, wherein at least one of said audio media files contains audio data for a first audio channel and at least another of said audio media files contains audio data for a second audio channel.]

[6. The system of claim 5, wherein one of said ring buffers receives and stores only video media data, another one of said ring buffers receives and stores only audio media data for said first channel and another one of said ring buffers receives and stores only audio media data for said second channel.]

[7. The system of claim 1, wherein said viewer module procedures to synchronize media data transfer include a data transfer coordinator to stage the transfer of data to said plurality of ring buffers so that at any one time the amount of data in one ring buffer is approximately equivalent to the amount of data in at least one other ring buffer.]

[8. The system of claim 7, wherein said transfer coordinator acts so that at any one time the amount of data in one ring buffer is approximately equivalent to the amount of data in all other ring buffers.]

[9. The system of claim 1, wherein said viewer module further comprises procedures for determining which of said ring buffers contains the least media data and transferring media data to the ring buffer having the least media data.]

[10. The system of claim 9, wherein said viewer module procedures include a transfer coordinator for transferring data to a ring buffer in disregard of other conditions when said ring buffer contents are below a predetermined minimum.]

[11. A method of displaying digitized media data on a monitor, comprising the steps of:

storing the media data in a plurality of media files and a plurality of ring buffers, at least one of which contains video media data and at least one of which contains audio media data;

determining which of the ring buffers contains the least media data;

reading media data from one of the media files into the ring buffer having the least media data;

signaling a sound accelerator card which plays a part of the media data found one of the audio ring buffers;

waiting for an interrupt from the sound accelerator card;

signaling a video accelerator card which plays the a part of the media data found in one of the video ring buffers.]

[12. The method of claim 11, further comprising the step of executing a critical read operation when the number of bytes contained in a ring buffer less than a predefined minimum.]

[13. The method of claim 12, further comprising the step of executing an efficient read operation when the number of bytes contained in a ring buffer is greater than a predefined number.]

[14. The system of claim 1, wherein the ring buffers are preloaded with data (before playing begins) to increase efficiency.]

[15. The method of claim 11, further comprising the step of determining the number of bytes of audio needed to properly synchronize with a given amount of video by using a proportion with the amount of video that was associated with this audio when it was digitized.]

[16. The system of claim 1, further enhanced by a set of capture masks used to efficiently play back material that was captured at fewer than 30 frames per second.]

*17. A process for transferring video data from one or more video data files stored in a file system of an operating system of a general purpose computer to a video playback device and audio data from one or more audio data files stored in the file system to an audio playback device, during synchronized playback of the audio and video, wherein a first buffer associated with the video playback device stores video data before playback and a second buffer associated with the audio playback device stores audio data before playback, the process comprising:*

*determining an actual amount of data in the first buffer;*

*determining an actual amount of data in the second buffer;*

*selecting one of the video data and the audio data according to the measured amount of data in the first buffer and the second buffer;*

*reading a desired amount of data from the data file for the selected data;*

*playing back the video data in the first buffer and the audio data in the second buffer in synchronism; and*

*repeating steps of measuring, selecting and reading while playing back the video data and audio data in synchronism.*

*18. The process of claim 17, wherein selecting one of the video data and the audio data comprises selecting the video data if the first buffer has a least amount of data and selecting the audio data if the second buffer has a least amount of data.*

*19. The process of claim 17, wherein selecting one of the video data and the audio data further comprises selecting the video data if the first buffer has an amount of data below a predetermined minimum and selecting the audio data if the second buffer has an amount of data below a predetermined minimum.*

*20. The process of claim 17, wherein selecting one of the video data and the audio data is performed independent of location of the video data and the audio data on a storage medium.*

*21. The process of claim 17, wherein selecting the desired amount of data to be read comprises selecting an amount of data such that the amount of data in the buffer for the selected data is roughly equivalent to the amount of data in the other buffer.*

*22. The process of claim 17, wherein playing back in synchronism comprises:*

*signaling one of the playback devices to play a part of the data in the buffer for the playback device, the playback device producing an output signal after playing said part; and*

*signaling the other of the playback devices to play a part of the data in the buffer for the other playback device.*

*23. The process of claim 17, wherein selecting comprises:*

*for each buffer, determining a state according to the determined amount of data in the buffer;*

*selecting an action according to the state of each buffer.*

*24. The process of claim 23, wherein the action is one of reading video data, reading audio data or waiting.*

*25. The process of claim 24, wherein the state of a buffer is one of critical, efficient and not critical and not efficient.*

*26. The process of claim 23, wherein the state of a buffer is one of critical, efficient and not critical and not efficient.*

*27. A process for transferring media data for a plurality of streams from a computer readable medium during playback of the media data to one or more output devices for playing back each stream, and wherein each stream has a buffer for storing media data before playback, the process comprising:*

*determining an actual amount of data in the buffer for each stream;*

*selecting one of the streams, and selecting a desired amount of data to be read for the stream;*

*for the selected stream, reading the desired amount of data from the computer readable medium into the buffer for the output device associated with the selected stream for playback by the output device; and*

*repeating steps of measuring, selecting and reading during playback of the media data of the plurality of streams.*

*28. The process of claim 27, wherein selecting one of the streams comprises selecting a first stream if the buffer for the first stream has a least amount of data and selecting a second stream if the buffer for the second stream has a least amount of data.*

*29. The process of claim 27, wherein selecting one of the streams comprises selecting a first stream if the buffer for the first stream has an amount of data below a predetermined minimum and selecting a second stream if the buffer for the second stream has an amount of data below a predetermined minimum.*

*30. The process of claim 27, wherein selecting one of the streams is performed independent of location of the media data on a storage medium.*

*31. The process of claim 27, wherein selecting the desired amount of data to be read comprises selecting an amount of data such that the amount of data in the buffer for the selected data is roughly equivalent to the amount of data in another buffer.*

*32. The process of claim 27, wherein playback comprises:*

*signaling one of the playback devices to play a part of the data in the buffer for the one of the playback devices, the one of the playback devices producing an output signal after playing said part; and*

*signaling another of the playback devices to play a part of the data in the buffer for the another of the playback devices.*

*33. The process of claim 27, wherein selecting comprises:*

*for each buffer, determining a state according to the determined amount of data in the buffer;*

*selecting an action according to the state of each buffer.*

*34. The process of claim 33, wherein the action is one of reading media data for a first stream, reading media data for a second stream or waiting.*

*35. The process of claim 34, wherein the state of a buffer is one of critical, efficient and not critical and not efficient.*

*36. The process of claim 33, wherein the state of a buffer is one of critical, efficient and not critical and not efficient.*

*37. A process for transferring video data from one or more data files stored in a file system of an operating system of a general purpose computer to a video playback device and audio data from the one or more data files stored in the file system to an audio playback device, during playback of the*

*audio and video, wherein a first buffer is associated with the video playback device to storing video data before playback and a second buffer is associated with the audio playback device to store audio data before playback, the process comprising:*

*determining an actual amount of data in the first buffer;*

*determining an actual amount of data in the second buffer;*

*selecting one of the video data and the audio data according to the measured amount of data in the first buffer and the second buffer;*

*for the selected data, reading a desired amount of data from the one or more data files in the file system; and*

*repeating steps of measuring, selecting, and reading while playing back the video data in the first buffer and the audio data in the second buffer.*

*38. The process of claim 37, wherein selecting one of the video data and the audio data comprises selecting the video data if the first buffer has a least amount of data and selecting the audio data if the second buffer has a least amount of data.*

*39. The process of claim 37, wherein selecting one of the video data and the audio data further comprises selecting the video data if the first buffer has an amount of data below a predetermined minimum and selecting the audio data if the second buffer has an amount of data below a predetermined minimum.*

*40. The process of claim 37, wherein selecting one of the video data and the audio data is performed independent of location of the media data on a storage medium.*

*41. The process of claim 37, wherein selecting the desired amount of data to be read comprises selecting an amount of data such that the amount of data in the buffer for the selected data is roughly equivalent to the amount of data in the other buffer.*

*42. The process of claim 37, wherein playing back in synchronism comprises:*

*signaling a one of the playback devices to play a part of the data in the buffer for the playback device;*

*the playback device producing an output signal after playing said part; and*

*signaling the other of the playback devices to play a part of the data in the buffer for the other playback device.*

*43. The process of claim 37, wherein selecting comprises:*

*for each buffer, determining a state according to the determined amount of data in the buffer;*

*selecting an action according to the state of each buffer.*

*44. The process of claim 43, wherein the action is one of reading video data, reading audio data or waiting.*

*45. The process of claim 44, wherein the state of a buffer is one of critical, efficient and not critical and not efficient.*

*46. The process of claim 43, wherein the state of a buffer is one of critical, efficient and not critical and not efficient.*

* * * * *